Feb. 9, 1932.  A. O. CODNEY  1,844,499
SPRAY PREVENTER FOR STORAGE BATTERIES
Filed Oct. 4, 1928
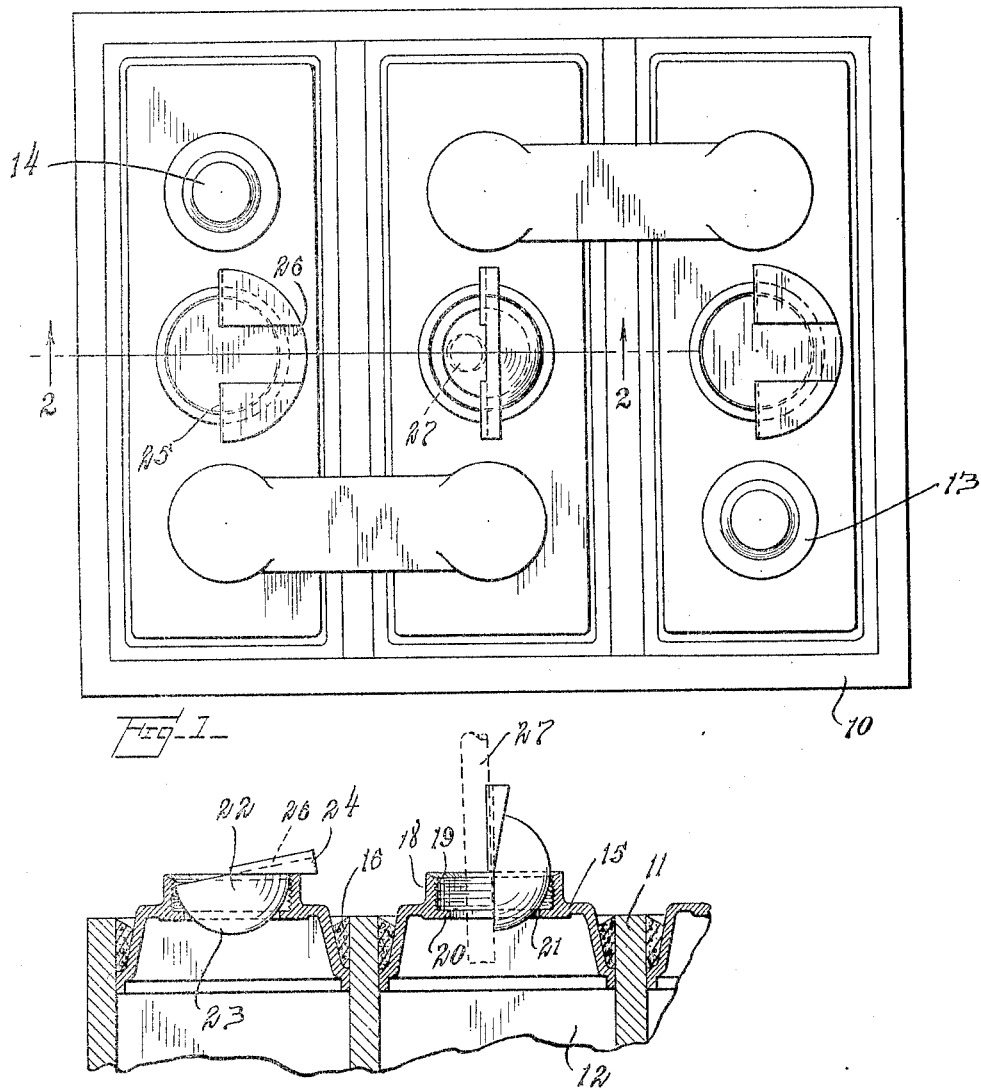
INVENTOR
Arthur O. Codney
BY
Kwis Hudson & Kent
ATTORNEYS Patented Feb. 9, 1932

1,844,499

UNITED STATES PATENT OFFICE

ARTHUR O. CODNEY, OF CLEVELAND, OHIO, ASSIGNOR TO WILLARD STORAGE BATTERY COMPANY, OF CLEVELAND, OHIO, A CORPORATION OF WEST VIRGINIA

SPRAY PREVENTER FOR STORAGE BATTERIES

Application filed October 4, 1928. Serial No. 310,260.

This invention relates to storage batteries and more particularly to a spray preventer which is intended to be used on the vent holes of storage batteries while they are being being charged.

One of the objects of the present invention is to provide a spray preventer of the type referred to which is normally self-closing and adapted to prevent the escapement of the spray or minute acid bubbles which are projected above the surface of the sulphuric acid electrolyte in the storage battery cell and out through its vent hole, which spray or bubbles are due to the natural evolution of hydrogen and oxygen gases on the plates during the charging operation.

Another object of the present invention is to provide a spray preventer whereby electrolyte may be added to or withdrawn from the cell of the storage battery or whereby an hydrometer syringe may be introduced into the storage battery cell for the purpose of reading the specific gravity of the withdrawn solution without the necessity of removing or replacing the vent plug during the charging operation.

A further object of the invention is to provide a spray preventer which is inexpensive to manufacture and efficient in operation.
Other objects of the invention reside in details of construction which will be hereinafter described and claimed.

Referring to the drawings:

Figure 1 is a top plan view of a storage battery illustrating a spray preventer embodying the invention in its normally closed and open positions;

Fig. 2 is a fragmentary vertical cross sectional view taken on line 2—2 of Fig. 1 showing the spray preventer in its normally closed position in one cell and in its open position in another cell, an hydrometer being inserted in one of the cells and illustrated in dotted lines.

In the drawings 10 represents the usual type of storage battery container or box composed of hard rubber or other suitable material. The container is divided so as to provide the desired number of cells, three being herein illustrated, for receiving the groups of positive and negative plates and the electrolyte. The cells 11 are provided with covers 15 fitting within the upper portion of the cells and maintained in position by any suitable sealing compound 16. Suitable screw threaded openings are provided in the covers 15, through which electrolyte or water may be added to the cells or a specific gravity recording taken, which are adapted to receive screw threaded vent plugs of the usual construction but not here shown. The battery is also provided with the usual positive and negative terminal posts 13 and 14 respectively to which may be attached any suitable conductors.

The covers 15 are provided with flanged openings 18 which are interiorly screw threaded at 19 to receive the usual screw threaded plugs when the battery is being used but which are not herein shown, the invention being applicable to other types of openings than here shown. These flanged openings 18 have laterally extending circular shoulders 20 formed adjacent the lower inner edges thereof to provide suitable openings 21 through which electrolyte or water may be introduced into the cells 12 or through which an hydrometer syringe may be introduced for the purpose of reading the specific gravity of the electrolyte within the respective cells of the storage battery.

The details of construction so far described are common in various types of storage batteries and form no part of the present invention, per se, but only in combination with the spray preventer which will be hereinafter more fully described.

The spray preventer 22 has a hemi-spherical portion 23, the greatest diameter of which is slightly less than the inside diameter of the flanged opening 18 and is normally positioned within the flanged opening in such a manner that the hemi-spherical portion 23 projects beyond the lateral circular shoulder 20 and substantially closes the opening 21. The spray preventer 22 is further provided with a laterally extending shoulder 24 formed integral with the upper surface of the hemispherical portion 23, one edge of the shoulder 24 terminating adjacent the transverse center of the hemi-spherical portion 23 while the semi-circular outer edge extends substantially beyond the outer periphery of the hemi-spherical portion 23 and is normally adapted to rest upon the upper edge of the flanged opening 18 to thereby maintain the spray preventer in its normally closed position. The portion of the shoulder which terminates adjacent the transverse center of the hemi-spherical portion 23 provides a fulcrum 25 about which the spray preventer is adapted to oscillate so that access may be had to the interior of the storage battery cell for the purposes already set forth. The shoulder 24 is provided with a slot 26 in its upper surface whereby when the spray preventer is moved to its vertical or open position, as shown in Fig. 2, the stem of an hydrometer syringe 27 may be disposed therein and extend through the opening 21 to add water to the storage battery cell or to withdraw the electrolyte for the purpose of reading the specific gravity thereof.

The hemi-spherical surface 23 on the underside of the spray preventer 22 projects downwardly beyond the upper edge of the circular shoulder 20 and substantially covers the opening 21. The acid bubbles which are caused by the natural evolution of hydrogen and oxygen gases on the plates during charge are projected upwardly and strike the projecting hemi-spherical surface 23 of the spray preventer 22 and condense thereon and said spherical surface allows the condensed acid to drip back into the cell and at the same time allows the gases which were enclosed within the acid bubbles, after bursting, due to their contact with the spherical surface, to escape around the periphery of the hemi-spherical portion 23, thereby preventing the acid bubbles from escaping through the vent hole 18 and accumulating upon the upper surface of the storage battery container. In this way the air in the room within which the storage batteries are being charged is prevented from becoming contaminated with minute floating sulphuric acid bubbles which heretofore would eventually settle and burst or condense upon objects in the room leaving condensed sulphuric acid on and causing corrosion of the objects upon which they settle. This hemi-spherical portion 23 of the spray preventer 22 further provides suitable means for guiding the spray preventer back into its normally horizontal or closed position after it has been moved to open position by the insertion of an hydrometer syringe or other article.

The self-righting or closing feature of the spray preventer 22 is obtained by having the center of gravity of the spray preventer below and to one side of its fulcrum 25 thus causing it to close or assume a horizontal position when placed upon the vent hole 18 of the cover of the cell with the hemi-spherical portion downward. The pressure of an object, such as an hydrometer syringe, on that part of the spray preventer fitting inside of the vent hole 18 causes the spray preventer to turn on its fulcrum 25 which rests on the upper edge of the flanged opening 18 until the spray preventer has turned into a vertical position shown in Fig. 2, the hemi-spherical portion 23 having been forced downward and to one side thus uncovering the major portion of the hole 21 surrounded by the circular shoulder 20 in the lower part of the cover 15 and permitting the insertion of a tube for the purpose of removing or adding solution to the electrolyte within the cell or for reading the specific gravity with an hydrometer syringe. The removal of the tube or hydrometer syringe relieves the pressure on the spray preventer and its center of gravity being almost entirely to one side of its fulcrum 25 causes it to turn back into a horizontal or closed position. This turning or pivoting is limited by the semi-circular counterweight shoulder 24 coming into contact with the upper edge of the flanged opening 18.

While I have described the preferred embodiment of the invention it is to be understood that I am not to be limited thereto inasmuch as changes and modifications may be resorted to without departing from the spirit of the invention, as defined in the appended claims.

Having thus described my invention, what I claim is:

1. In a device of the character described, the combination with a storage battery having a cover provided with a vent opening and a flange surrounding the latter, of a spray preventer comprising a hemi-spherical portion adapted to be disposed within said flange with the hemi-spherical portion extending downwardly through said opening, and a laterally extending portion adjacent the upper surface of said hemi-spherical portion adapted to cooperate with said flange to thereby provide a fulcrum about which said hemi-spherical portion is adapted to oscillate.

2. In a device of the character described, the combination with a storage battery having a cover provided with a vent opening and a flange surrounding the latter, of a spray preventer comprising a hemi-spherical portion adapted to be disposed within said flange with the hemi-spherical portion extending downwardly through said opening, and an integral lateral extension adjacent the upper surface of said hemi-spherical portion adapted to engage with said flange when said spray preventer is in normally closed position, said extension and flange further cooperating to provide a fulcrum about which said hemi-spherical portion is adapted to oscillate when said spray preventer is moved to open position.

3. In a device of the character described, the combination with a storage battery having a cover provided with a vent opening and a flange surrounding the latter, of a spray preventer comprising a hemi-spherical portion adapted to be disposed within said flange with the hemi-spherical portion extending downwardly through said opening, and a stop on said hemi-spherical portion adapted to engage with said flange to maintain the spray preventer in its normally closed position, said hemi-spherical portion being adapted to oscillate within said flange whereby the former may be moved to open position.

4. In a device of the character described, the combination with a storage battery having a cover provided with a vent opening and a flange surrounding the latter, of a spray preventer comprising a hemi-spherical portion adapted to be disposed within said flange with the hemi-spherical portion extending downwardly through said opening, and a laterally extending portion adjacent the upper surface of said hemi-spherical portion adapted to cooperate with said flange to thereby provide a fulcrum about which said hemi-spherical portion is adapted to oscillate, the center of gravity of the spray preventer with respect to the axis of oscillation being eccentric whereby said spray preventer is normally maintained in closed position.

5. A spray preventer for storage batteries comprising a top portion and a spherically rounded under portion adapted to fit within the vent opening of the battery, and a supporting member adjacent the top portion and extending beyond the edge of said spherically rounded under portion, said supporting member extending partway only around said top portion.

6. A spray preventer for storage batteries comprising a top portion and a spherically rounded under portion adapted to fit within the opening of the battery, and a semi-circular laterally extending flange having a flat edge portion and being adjacent said top portion.

7. A spray preventer for storage batteries comprising a top portion and a spherically rounded under portion adapted to fit within the vent opening of the battery, and a semi-circular laterally extending flange integral with said top portion and having a flat edge portion extending transversely thereof.

8. A spray preventer for storage batteries comprising a top portion and a spherically rounded under portion adapted to fit within the vent opening of the battery, a semi-circular laterally extending flange integral with said top portion, and a radially extending groove in the upper surface of said flange.

In testimony whereof, I hereunto affix my signature.

ARTHUR O. CODNEY.